March 10, 1964     H. W. HUFFMAN     3,124,350
SCREW FOLDER FOR CONTINUOUS FORMS
Filed March 15, 1962             4 Sheets-Sheet 1
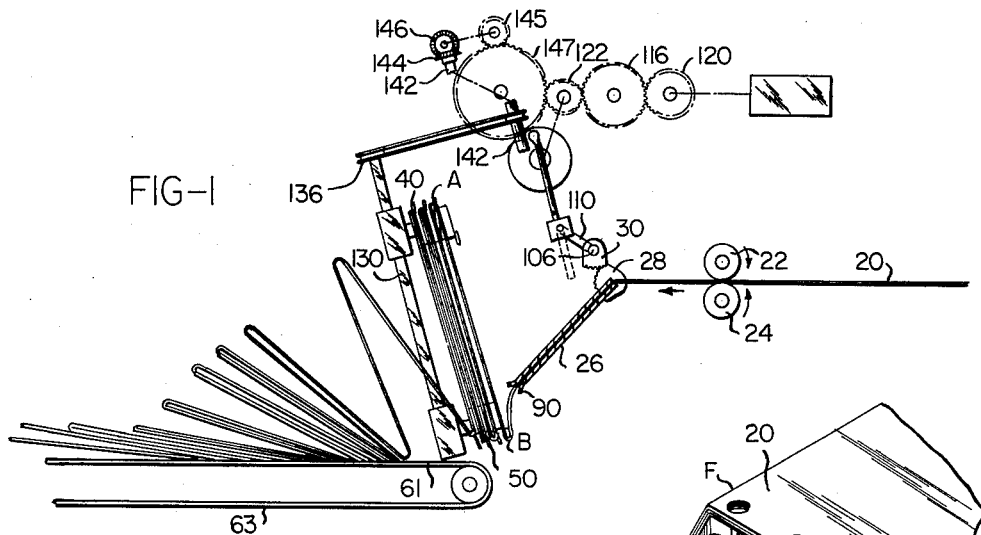
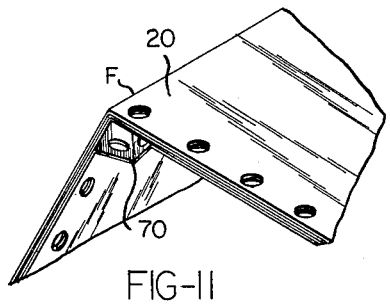
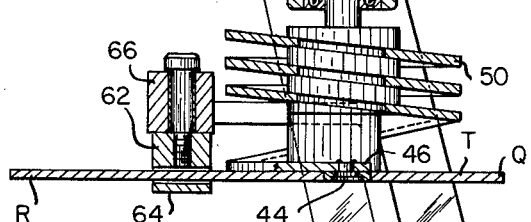
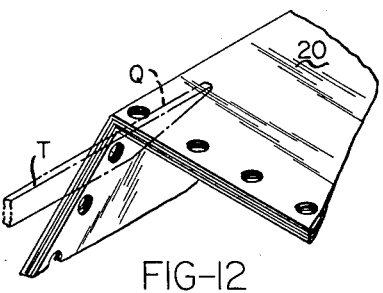
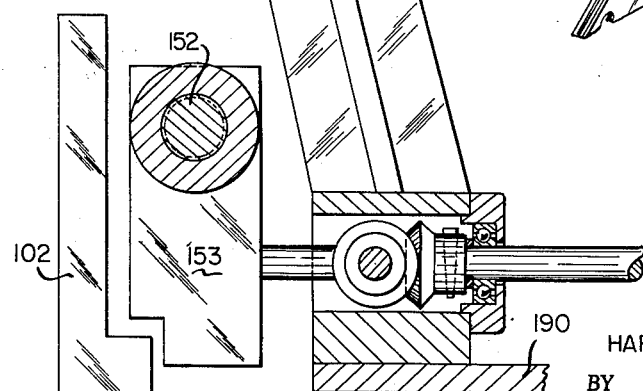
INVENTOR.
HAROLD W. HUFFMAN
BY
*J. Warren Kinney Jr.*
ATTORNEY

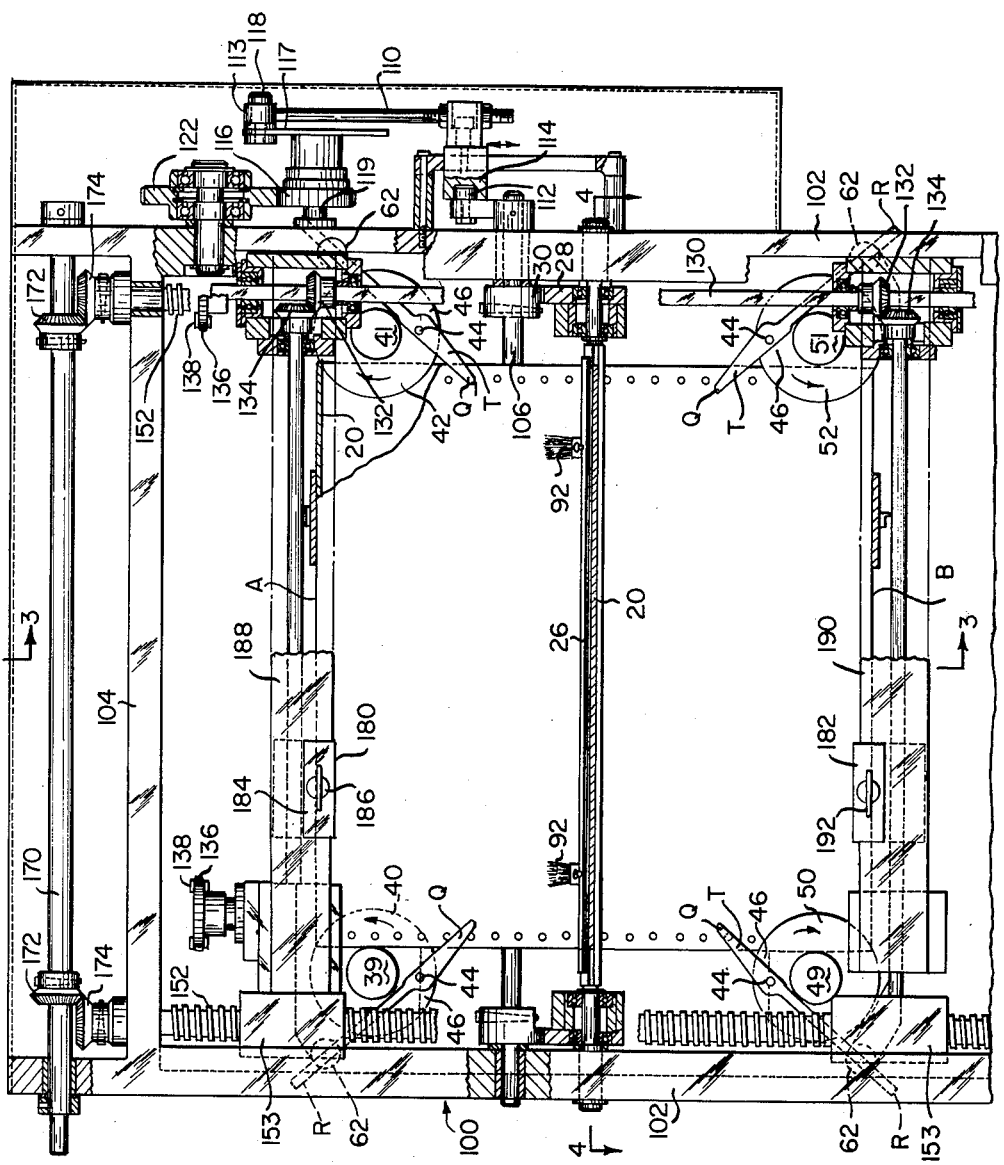

March 10, 1964  H. W. HUFFMAN  3,124,350
SCREW FOLDER FOR CONTINUOUS FORMS
Filed March 15, 1962  4 Sheets-Sheet 3
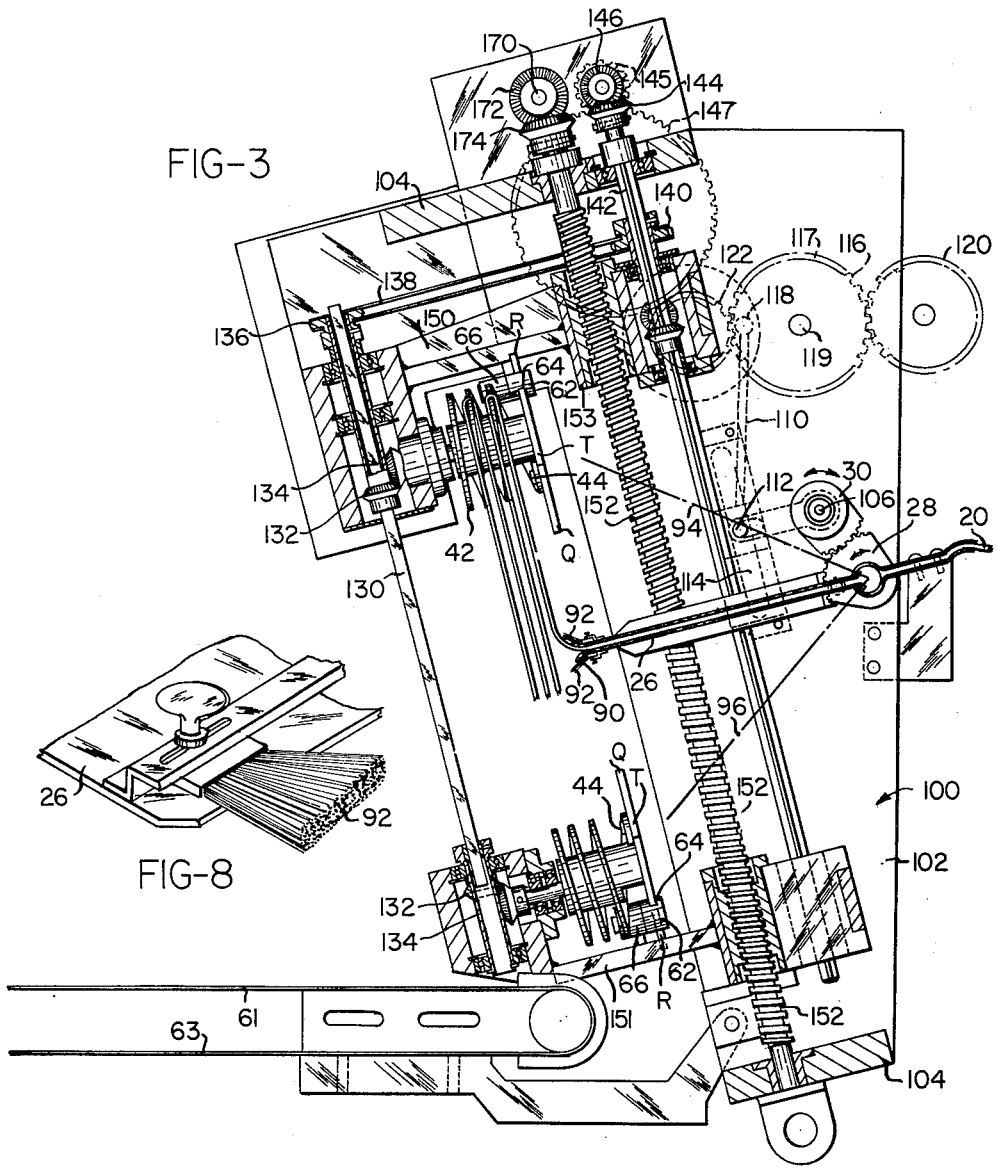
INVENTOR.
HAROLD W. HUFFMAN
BY
*J. Warren Kinney Jr.*
ATTORNEY March 10, 1964
H. W. HUFFMAN
3,124,350
SCREW FOLDER FOR CONTINUOUS FORMS
Filed March 15, 1962
4 Sheets-Sheet 4
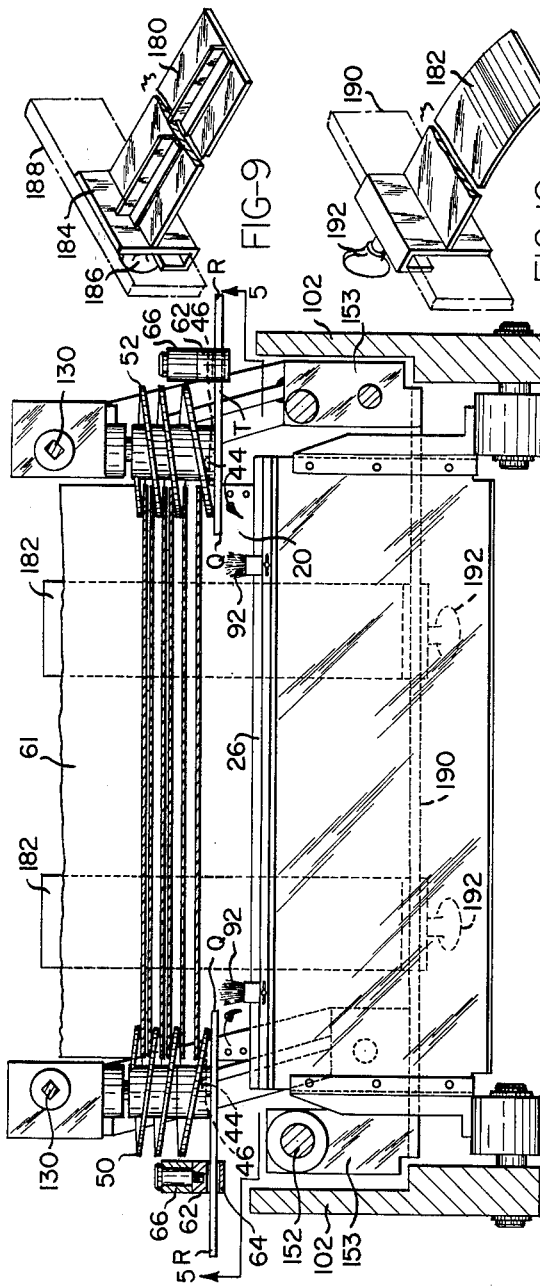
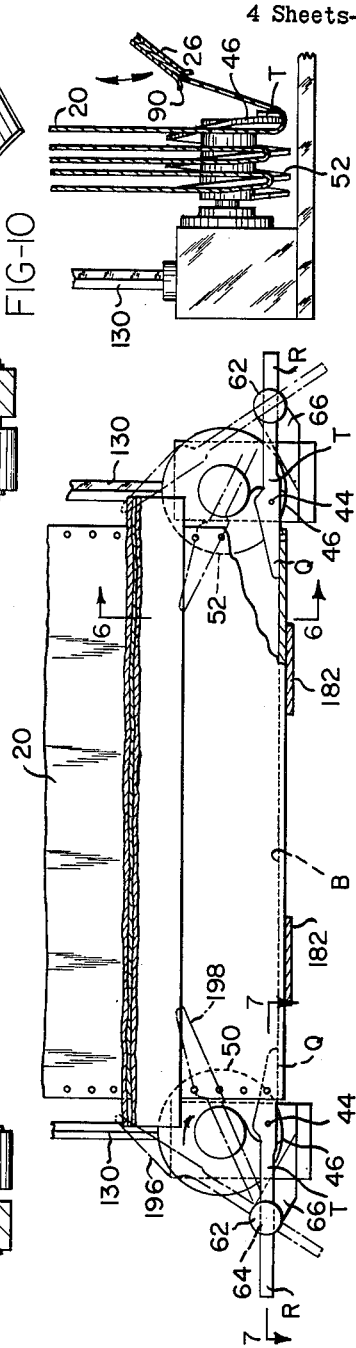
INVENTOR.
HAROLD W. HUFFMAN
BY
ATTORNEY

United States Patent Office 3,124,350
Patented Mar. 10, 1964

3,124,350
SCREW FOLDER FOR CONTINUOUS FORMS
Harold W. Huffman, Hamilton, Ohio, assignor to The Hamilton Tool Company, Hamilton, Ohio, a corporation of Ohio
Filed Mar. 15, 1962, Ser. No. 179,907
20 Claims. (Cl. 270—79)

This invention relates to a screw folder for continuous forms, and in particular to a screw folder having means associated therewith for providing clean, well-defined, positive folds in the forms.

An object of the invention is to provide tucker plates or blades in association with the fold-conveying screws of a zig-zag screw folder, for providing positive, well-defined folds transversely of a continuous web being folded in zig-zag fashion by an oscillating chute.

Another object of the invention is to provide means which are co-operatively associated with the fold-conveying screws of a zig-zag screw folder for precluding the occurrence of "back folding" or "tenting" at the folds in one or more of the plies of a multi-ply web.

A further object of the invention is to provide each of the fold-conveying screws of a zig-zag screw folder with a tucker element or blade which internally engages the web at a location of a transverse fold therein in advance of the conveying screw, for providing a clean, well-defined fold in the web, which fold is then advanced onto the fold-conveying screw.

Still another object of the invention is to provide means having the hereinabove described characteristics, which are simple yet highly effective in their operation and which may be associated with the fold-conveying screws of conventional zig-zag screw folders without affecting other portions of the folder.

These and other objects are attained by the means described herein and as disclosed in the accompanying drawings, in which:

FIG. 1 is a schematic side view of a portion of a tucker type screw folder embodying the teachings of the present invention.

FIG. 2 is a front elevation of the fold-conveying screw portion of the device of FIG. 1 with parts thereof in section.

FIG. 3 is a sectional view taken on line 3—3 of FIG. 2.
FIG. 4 is a sectional view taken on line 4—4 of FIG. 2.
FIG. 5 is a sectional view taken on line 5—5 of FIG. 4.
FIG. 6 is a sectional view taken on line 6—6 of FIG. 5.
FIG. 7 is a sectional view taken on line 7—7 of FIG. 5.
FIG. 8 is a perspective view illustrating a brush assembly which comprises a detail of the invention.

FIGS. 9 and 10 are perspective views of top and bottom plates comprising a detail of the invention.

FIG. 11 is a perspective view illustrating a condition known as "back fold" or "tenting" in one or more of the plies in the fold of a multi-ply web.

FIG. 12 is a perspective view illustrating the manner in which the tucker blades of my invention engage and support the innermost ply of a multi-ply web at a transverse fold thereof whereby to positively and effectviely preclude the occurence of "back folding" or "tenting" of FIG. 11.

With particular reference now to FIG. 1, the numeral 20 denotes generally a continuous, multi-ply web which has been previously processed and completed except for final folding. The present invention is neither concerned with nor directed to the various steps or means by which said various steps have been performed on the web of FIG. 1; however, in the preferred embodiment of the invention it is contemplated that web 20 will have been provided with cross-perforation for defining the preferred location of the folds to be made in the web.

The numerals 22 and 24 denote a pair of rollers which grip and drive web 20 forwardly, that is, to the left as viewed in FIG. 1, into and through an oscillating chute 26 which is caused to oscillate throughout a controlled arc determined by gears 28 and 30 for imparting alternate, opposed upper and lower loops A and B, respectively, transversely of the web.

Heretofore the loops A and B, thus formed, were fed directly to the spiralled lips of two laterally spaced sets of transversely spaced pairs of screw conveyors 40—42 and 50—52 of FIG. 2, which conveyors advanced the now folded web in zig-zag form forwardly, away from chute 26 and then onto the upper reach 61 of an endless conveyor 63 such as, by way of example, is schematically illustrated in FIG. 1.

From the foregoing, it will be noted that the resultant fold at A and B was dependent on and a function of the loop-forming action of chute 26 in conjunction with the transverse perforations provided in web 20, and it was quite common for one or more of the inner plies of web 20 to be misplaced inwardly as at 70, see FIG. 11, at the outer end of the web adjacent a transverse fold F. This condition is known as "back folding" or "tenting," and is highly objectionable.

It is a primary object of the present invention to provide simple yet highly effective means for automatically and effectively preventing the occurrence of back folds and/or tenting, as illustrated at 70 in FIG. 11.

With particular reference now to FIGS. 2 and 3, the letters T denote tucker elements or blades, one for each of the fold-conveying screws 40—42 and 50—52 of the zig-zag screw folder machine.

Each of the tucker elements T is pivotally mounted as at 44 to the leading edge of the convolute, spiralled lip portions 46 of a fold-conveying screw. Each of the tucker elements T comprises a forwardly projecting blade portion or extension Q and a rearward extending actuator portion or tail R, which latter portion R is supported for oscillating motion with reference to a pivot block 62, which is provided with an elongate slot 64 for sliding reception of portion R of a tucker blade. The pivot blocks may be mounted upon suitable arms 66 carried by adjustable brackets 150 and 151 on screw 152.

With particular reference now to FIGS. 2, 3 and 7, it will be noted that rotation of each fold conveying screw in the directions indicated by the headed arrow of FIG. 2 will cause the tucker blades of the laterally spaced sets 40—42 and 50—52 of the conveying screws to be advanced whereby the tucker blades T associated with the fold conveying screws 40 and 42 will be progressively advanced toward one another as they are elevated thereby to advance interiorly of top loops A, as said top loops are formed by the oscillator chute. The upper edge Q of the tucker blades will literally lift the paper web at the loop whereby to positively fold the web transversely along the transverse portion thereof. Further rotation of the conveying screws will result in the tucker blades being withdrawn outwardly from engagement with the fold during which time the tucker-blade-suspended fold is advanced onto the leading edge of the fold-conveying screw with which the particular tucker blade is associated.

The fold will be then continuously and automatically conveyed away from the tucker chute and discharged from the trailing end of the fold-conveying screws and thence onto the upper reach 61 of the endless conveyor 63.

It should be understood that the tucker blades T, which are positively associated with the fold-conveying screws of set 50—52, are operated whereby to engage the interior of the lower loops B for providing a positive fold in said lower loops along the transverse perforations thereof.

From the foregoing, it will be noted that the action of the tucker blades T is such as to positively prevent the occurrence of "back folding" or "tenting," as illustrated at 70 in FIG. 11.

In the preferred embodiment of the invention, and as best illustrated in FIGS. 2, 3 and 4, the forward or discharge end 90 of the chute 26 is provided with brushes 92 which are adapted to sweep the rearmost surface of the web being discharged through chute 26 as it is oscillated between the upper and lower limits indicated generally by the numerals 94 and 96 of FIG. 3.

It will be understood that the rate of oscillation of chute 26 and the lateral spacing of the various fold-conveying screws 40—42 and 50—52 and the rate of rotation of said screws are timed in accordance with the spacing of the cross-perforations of the web. The transverse spacing of the fold-conveying screws of each set 40—42 and 50—52 is determined by the overall width of the web, it being noted that, note FIG. 2, the transverse distance between the shafts 39—41 of the fold-conveying screws 40—42 and 50—52 closely approximates the overall width of a web. It will further be noted that the outer ends of the fold-adjacent portions of the web are engaged by the outwardly extending convolutions or spiral lips 46, as has heretofore been customary in conventional tucker type screw folders.

With particular reference now to FIGS. 2 and 3, the numeral 100 denotes generally a framework including laterally spaced upright side elements 102 interconnected by transvese element 104. The oscillator chute 26 comprises a pair of laterally spaced plates which define an elongate channel or passageway through which the continuous web is passed. Gear segments 28 and 30 are suitably mounted for rocking movement between limits indicated by the numerals 94 and 96, gear segment 30 being carried by rock shaft 106 suitably journaled between side plates 102. The numeral 110 denotes a crank arm which reciprocates a crank pin 112 which is adapted to slide within elongate channel 114 for imparting rocking motion to gear segment 30 incident to rotation of gear 116. The upper end 113 of crank arm 110 may be pivoted as at 118, upon a crank disc 117 which is fixed upon the shaft 119 of gear 116.

Gear 116 is driven by gear 120 and drives gear 122. The pairs of fold-conveying screws 40—42 and 50—52 are driven by square shafts 130 through bevel gearing 132 and 134; shaft 132 being driven by sprocket 136, chain 138 and sprocket 140 of shaft 142 which is rotated by bevel gears 144 and 146, the latter being driven by pinion 145 in the gear train 147, 122, 116 and 120.

Each of the fold conveying screw assemblies is secured to and carried by a bracket 150, one end 153 of which threadably engages lead screw 152 which is rotatably journaled between transverse members 104 of the frame. Rotary motion may be imparted to lead screw 152 by rotating shaft 170 which is in driven relationship with the lead screws by means of bevel gears 172 and 174. Rotation of shaft 170 and lead screws 152 will effect uniform shifting of brackets 150 and 151 toward or away from one another, thereby enabling an operator to quickly and conveniently adjust the vertical spacing of the pairs of fold-conveying screws 40—42 and 50—52 in accordance with the spacing that may exist between the transverse perforations of different webs 20 to be folded.

It should be understood that the fold-conveying screws of set 40—42 will always be disposed above the center line about which the chute 26 oscillates by an amount equal to the spacing of the fold-conveying screws 50—52 of the other set below said line.

Each of the brackets 150 and 151 may be mounted for horizontal adjustment, if desired, to accommodate webs of differing widths, this being common in the art.

It should be understood that the foregoing structural details of the fold-conveying screws and oscillating chute, exclusive of the tucker blade accessory, are exemplary rather than restrictive, and that the present invention is neither directed to nor concerned with the aforesaid structural details.

In FIGS. 2, 4, 9 and 10, top and bottom guide plates are indicated at 180 and 182, respectively. The lowermost folds of the folded web rest upon plates 182, while the uppermost folds lightly contact the top plates 180 to impart a measure of stability to the folds as they are advanced by the rotating fold-conveying screws 40—42 and 50—52. Plates 180 may each include a mounting head 184 carrying a thumb screw 186 whereby the plate may be adjustably secured to an upper cross bar 188 which spans the adjustable brackets 153. Plates 180 therefore move with the brackets whenever screws 152 are rotated to vary the elevation of the fold-conveying screws 40—42.

In like manner, the bottom plates 182 are adjustably mounted upon a lower cross bar 190 which spans the lower pair of brackets 153, these plates being held upon bar 190 by means of thumb screws 192. The several plates may be adjustably positioned along the length of their respective cross bars for controlling behavior of the folds of the web during advancement by the fold-conveying screws.

With particular reference to FIG. 5, it will be noted that the tucker blade T being pivoted upon the fold-conveying screw at 44, moves in accordance with rotation of the screws. The blade in the full-line position shown, will, upon clockwise rotation of screw 50, move outwardly while wiping the fold B to eliminate tenting. The tail R of the blade, as previously explained, slides freely through block 62 to a limit determined by pivot 44 reaching a point where the pivot is closest to the block.

Continued rotation of screw 50 carries pivot 44 upwardly to a point at which blade T reaches a maximum inclination shown by broken lines 196, wherein the upper end of the blade is withdrawn from the web fold. Then, as screw 50 continues to rotate, its upper end is projected toward the web (see the middle position 198) and within a succeeding fold, so as to gradually drop to the full-line position where it engages and wipes the web fold with sufficient force to remove any tents or infolds that may have occurred during the folding procedure initiated by the oscillating chute 26.

The above action occurs at both of the side edges of the web, since at each side is located a tucker blade T as FIG. 5 indicates.

Precisely the same action occurs at the upper folds A of the web (see FIG. 2), where tucker blades T are shown associated with the upper fold-conveying screws 40 and 42. At the upper fold A, however, the tucker blades perform by advancing upwardly into the fold, rather than downwardly, to engage and wipe the inside of the fold A. Thus, at every upper and lower fold of the web, a pair of tucker blades enters and performs to break down any infolding or tenting that may occur in any of the web plies incident to the folding initiated by the oscillating chute 26.

It should be observed that notwithstanding the various adjustments provided for accommodating webs of different widths, and webs having different distances between fold lines, the relationship of elements shown in FIG. 2 at 153, 40, 188, and 62 remains constant or fixed. In other words, these elements constitute a unit which is bodily shiftable incident to rotation of adjusting screws 152, and the elements of the unit will always have the relationship indicated upon the drawings. This applies at each of the fold-conveying screw locations 40, 42, 50, and 52. The present invention is directed to this phase of the disclosure exclusively, and is not concerned with the folding machine in general.

It is to be understood that various modifications and changes may be made in the structural details of the apparatus, within the scope of the appended claims, without departing from the spirit of the invention.

What is claimed is:

1. The combination with rotatable fold-conveying screws of a zig-zag screw folder including an oscillatable chute intermediate the screws for producing alternate opposed loops transversely of a continuous web passing therethrough, and means for rotatably supporting the screws; of a tucker blade for each of said conveying screws, and means supporting each blade and operative to advance the blade in a plane substantially parallel with a side of a fold and interiorly of a loop, engage the loop and provide a positive fold in the outer ends thereof, and advance the folded outer end of the loop onto the leading edge of a fold-conveying screw.

2. The combination with rotatable fold-conveying screws of a zig-zag screw folder including an oscillatable chute intermediate the screws for producing alternate opposed loops transversely of a continuous web passing therethrough, and means for rotatably supporting the screws; of a tucker blade carried by each of said fold-conveying screws, and means operatively connecting each blade to a fold-conveying screw to advance the blade in a plane substantially parallel with a side of a fold and interiorly of a loop, and engage the loop for establishing a positive fold in the outer ends of each loop.

3. The combination with rotatable fold-conveying screws of a zig-zag screw folder including an oscillatable chute intermediate the screws for producing alternate opposed loops transversely of a continuous web passing therethrough, and means rotatably supporting the screws; of a tucker blade for each of said conveying screws, and means supporting the blades and operative to advance the blades in planes substantially parallel with a side of a fold and momentarily into the loops and against the fold lines thereof, to break down any loop malformation initially produced in the course of the folding operation initiated by the oscillatable chute.

4. The combination as set forth in claim 3, wherein the momentary advancing motion of each tucker blade is imparted thereto by and in synchronism with the rotational movement of its associated fold-conveying screw.

5. In combination with spaced rotatable fold-conveying screws of a zig-zag screw folder including means to initially produce between the screws alternate opposed loops transversely of a continuous web fed thereto, a series of movable tucker blades each supported adjacent to a fold conveying screw for a rectilinear movement, and means for advancing and retracting the blades in synchronism with the said loop producing means for projecting an end portion of each blade momentarily into a loop to engage and depress the fold line of the loop, for finally shaping said loops.

6. In combination with spaced rotatable fold-conveying screws of a zig-zag screw folder including means to initially produce between the screws a succession of opposed loops transverserly of a continuous web fed to said means, a series of movable tucker blades, means supporting said cutter blades in a position to have an end portion projectable momentarily into the loops to depress the fold line of each loop and thereby finally shape the loops, and means carried by the fold-conveying screws for effecting said momentary projecting of the tucker blades and withdrawing the aforesaid end portions of the blades from the loops.

7. The combination as set forth in claim 6, wherein the motion of each tucker blade is oscillatory so as to effect a linear wiping action upon the fold line of each loop interiorly thereof as the blade is withdrawn.

8. The combination with the rotatable fold-conveying screws of a zig-zag screw folder including means to initially produce a succession of opposed loops transversely of a continuous web fed thereto, of a series of movable tucker blade elements each having a forwardly extending blade portion and a rearwardly extending tail, means intermedite, the blade portion and the tail for pivoting each tucker element upon an end convolution of such fold- conveying screw transversely of the screw axis, with the forwardly extending blade portion disposed for entry and withdrawal with respect to a web fold upon each full rotation of the screw carrying the tucker element, means guiding the tail end of the tucker element as the pivot means thereof moves with the fold-conveying screw, to impart an oscillatory motion to the forwardly extending blade portion while disposed within a web fold, and means supporting the web fold in position for exposing its line of fold to impact of said blade portion as the latter is withdrawn from the fold incident to rotation of its associated fold-conveying screw.

9. The combination as set forth in claim 8, wherein the tail guide of each tucker element is mounted upon a normally stationary part of the folder apparatus, at a fixed distance from the axis of rotation of the fold-conveying screw.

10. The combination with a rotatable fold-conveying screw of a zig-zag screw folder, including a bracket for supporting the screw, and means to initially produce a succession of opposed loops transversely of a continuous web fed thereto, of an oscillatable tucker element having a rearwardly extending tail portion and a forwardly extending blade portion, the latter portion being adapted to enter a few fold and to withdraw therefrom upon each full rotation of the fold-conveying screw, pivot means on the tucker element intermediate the tail portion and the forwardly extending blade portion, for connecting the tucker element to a convolution of the fold-conveying screw in transverse relation to the screw axis, a guide member for the tail portion of the tucker element, comprising a channeled block in which the tail portion may slide longitudinally, means pivoting the block upon the screw-supporting bracket at a fixed distance from the screw axis, and means supporting the web fold in position for exposing its line of fold to impact of said blade portion as the latter is withdrawn from the fold incident to rotation of the fold-conveying screw.

11. The combination as set forth in claim 10, wherein the pivot means for the tucker element is so located upon the fold-conveying screw as to effect withdrawal of the blade portion from the fold along a line of travel coinciding substantially with the elevation of the web fold support means, thereby causing the blade portion to wipe the fold line of the web as the blade portion is withdrawn from the fold.

12. The combination with a rotatable fold-conveying screw of a zig-zag screw folder, including a support for rotatably supporting the screw, and means to initially produce a succession of opposed loops transversely of a continuous web fed thereto, of an oscillatable tucker element having a rearwardly extending tail portion and a forwardly extending blade portion, the latter portion being adapted to enter a web fold and to withdraw therefrom upon each full rotation of the fold-conveying screw, pivot means on the tucker element intermediate the tail portion and the forwardly extending blade portion, for connecting the tucker element to a convolution of the fold-conveying screw in transverse relation to the screw axis, a guide member on the aforesaid support, adapted to slidably support the tail portion of the tucker element at a fixed distance from the axis of rotation of the fold-conveying screw, and means supporting the web fold in position for exposing its line of fold to impact of said blade portion as the latter is withdrawn from the fold incident to rotation of the fold-conveying screw.

13. The combination as set forth in claim 12, wherein the guide member and the pivot means for the tucker element are so located relative to the axis of rotation of the fold-conveying screw, as to effect withdrawal of the blade portion along a line of travel which coincides substantially with the plane of elevation of the web fold support means.

14. As an element of a zig-zag screw folder for the production of a repeatedly folded continuous web, a fold-conveying rotatable screw having a series of web-engaging helical convolutions one of which is a web entry convolution including an entry lip, an elongate tucker element having a rearwardly extending tail portion, a forwardly extending blade portion, and an intermediate mounting portion, and means pivoting said mounting portion of the tucker element upon the entry lip of the fold-conveying screw, with the longitudinal axis of the tucker element disposed transversely of the axis of rotation of the screw.

15. As an element of a zig-zag screw folder for the production of a repeatedly folded continuous web, a fold-conveying rotatable screw having a series of web-engaging helical convolutions one of which is a web entry convolution including an entry lip, an elongate tucker element having a rearwardly extending tail portion, a forwardly extending blade portion, and an intermediate mounting portion, and means pivoting said mounting portion of the tucker element upon the entry lip of the fold-conveying screw, with the longitudinal axis of the tucker element disposed substantially at right angles to the axis of rotation of said screw.

16. As an element of a zig-zag screw folder for the production of a repeatedly folded continuous web, a fold-conveying rotatable screw having a series of web-engaging helical convolutions one of which is a web entry convolution including an entry lip, an elongate tucker element having a mounting portion and an extending blade portion, and means pivoting said mounting portion of the tucker element upon the entry lip of the fold-conveying screw, with the major axis of the tucker element disposed transversely of the axis of rotation of said screw.

17. As an element of a zig-zag screw folder for the production of a repeatedly folded continuous web, a fold-conveying rotatable screw having at least one web-engaging convolution including a web entry lip, an elongate tucker element having a mounting portion and an extending blade portion, and means pivoting said mounting portion of the tucker element upon the entry lip of the screw, with the longitudinal axis of the tucker element disposed substantially at right angles to the axis of rotation of the screw.

18. In apparatus for forming alternate opposed loops in and transversely of a continuously moving web, spaced rotatable fold conveying screws, a web guiding chute supported for oscillation between the screws to form opposed loops in and transversely of a web passing therethrough, an elongate tucker blade movably supported adjacent to each screw, and means operatively connected with each blade for moving the same synchronously with and in a path perpendicular to the rotary axis of the adjacent screw and into a loop and into engagement with the loop to provide a positive fold in the adjacent end of the loop.

19. In apparatus for forming alternative opposed loops in and transversely of a continuously moving web, spaced rotatable fold conveying screws, a web guiding chute supported for oscillation between the screws to form opposed loops in and transversely of a web passing through the chute, an elongate tucker blade supported adjacent to each screw, means pivotally connecting each blade inwardly of one end thereof, with an end of a lip of the adjacent screw for turning on an axis parallel to the rotary axis of the screw, and means adjacent to each screw in operative connection with the adjacent blade between said pivot connecting means and the opposite end thereof to impart a simultaneous oscillatory and reciprocatory movement to the blade in synchronism with rotation of the screw and formation of the loops and in a plane perpendicular to the said axis of the screw to effect introduction of said one end of the blade into a loop and into engagement with the loop to provide a positive fold in the adjacent end of the loop, followed by withdrawal of the said one end of the blade from the loop.

20. The invention according to claim 19, wherein the last said means comprises a slotted block supported outwardly from the screw with respect to the folded web, for pivotal movement on an axis paralleling the said screw axis and having the portion of the blade between the said pivot means and said opposite end, slidably supported in the slot of the block.

References Cited in the file of this patent

FOREIGN PATENTS 1,227,938     France _____ Aug. 24, 1960